J. H. HANES.
FLY TRAP.
APPLICATION FILED NOV. 1, 1912.
1,077,066.
Patented Oct. 28, 1913.
2 SHEETS—SHEET 2.
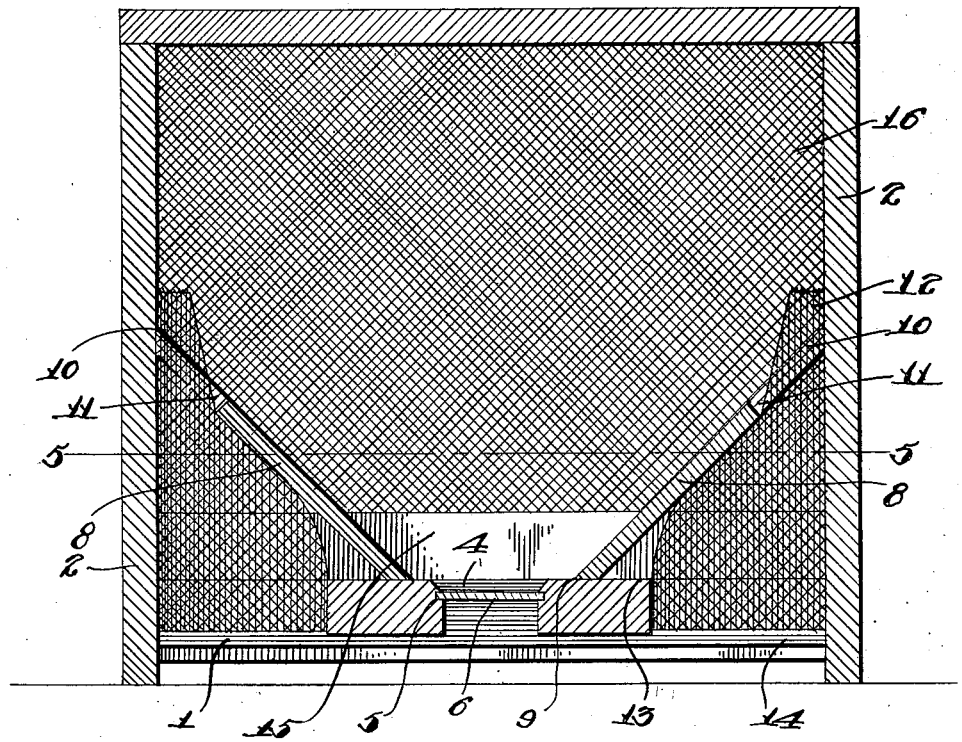
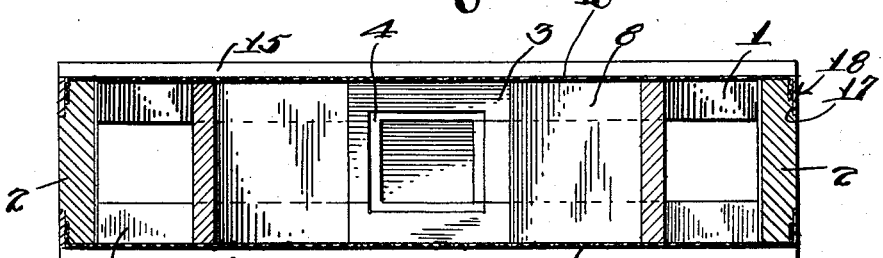
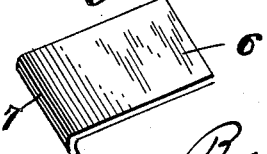
Witnesses
Howard F. Costello
Irvo L. McCathran
Inventor
John H. Hanes
By E. E. Vrooman,
his Attorney.
COLUMBIA PLANOGRAPH CO., WASHINGTON, D. C.

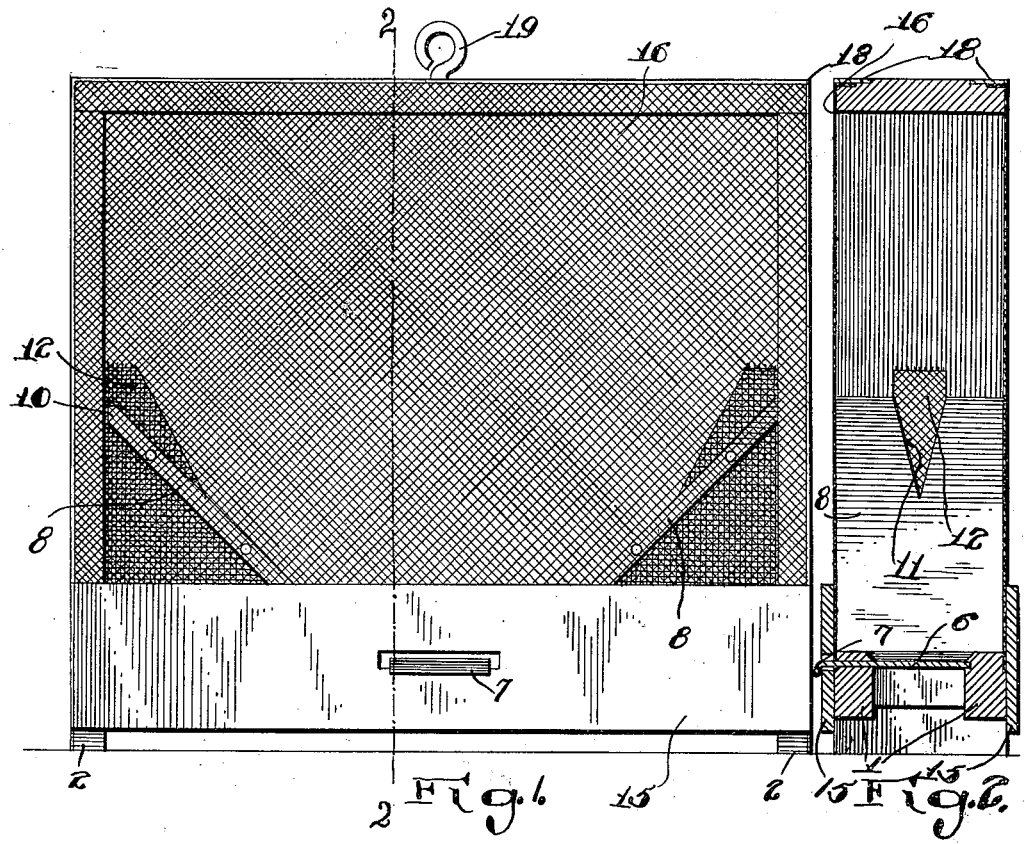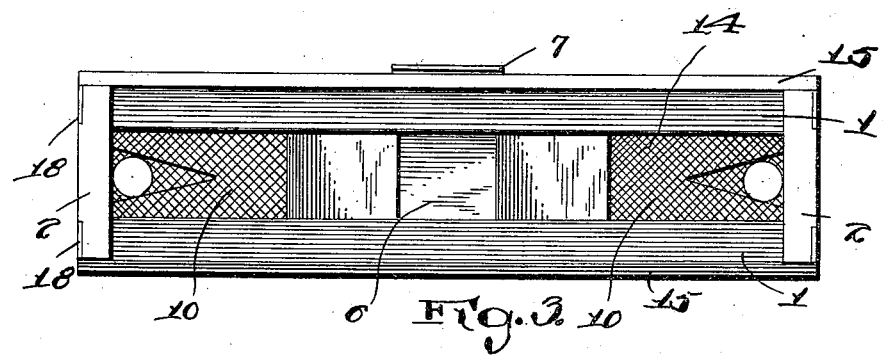

UNITED STATES PATENT OFFICE.

JOHN H. HANES, OF CABOOL, MISSOURI.

FLY-TRAP.

1,077,066. Specification of Letters Patent. Patented Oct. 28, 1913.

Application filed November 1, 1912. Serial No. 729,052.

*To all whom it may concern:*

Be it known that I, JOHN H. HANES, a citizen of the United States, residing at Cabool, in the county of Texas and State of Missouri, have invented certain new and useful Improvements in Fly-Traps, of which the following is a specification, reference being had therein to the accompanying drawing.

This invention relates to fly traps and has for its object the production of a simple and efficient fly trap whereby the flies may be easily removed from the trap after having been admitted thereto.

Another object of this invention is the production of a simple and efficient trap whereby the flies will enter the bottom of the trap in such a manner as to prevent the flies from getting out of the trap after once being admitted thereto.

With these and other objects in view, this invention consists of certain novel constructions, combinations and arrangements of parts as will be hereinafter fully described and claimed.

In the drawings: Figure 1 is a front view of the trap. Fig. 2 is a central vertical sectional view of the trap taken on line 2—2 of Fig. 1. Fig. 3 is a bottom plan view of the trap. Fig. 4 is a central vertical section through the trap at right angles to the section taken in Fig. 2. Fig. 5 is a section taken on line 5—5 of Fig. 4. Fig. 6 is a detailed perspective view of the sliding door adapted to close the discharge opening.

By referring to the parts by numerals it will be seen that "1" designates the base supporting bars which have their ends secured to the vertically extending side members 2.

A platform 3 is supported upon the base members 1, and is provided with an opening 4 for allowing the discharge of the flies from the trap. This opening 4 is provided with a groove 5 upon its side edges for receiving the sliding door 6, adapted to work therein. This slidable door 6, is provided with a downwardly projecting lip 7, for allowing the door 6 to be moved backward and forward within the grooves 5.

Inclined partitions 8 are positioned upon the framework 3 and have their lower ends 9 adjacent to the aperture 4. The upper ends 10 of the partitions 8, rest against the inner faces of the side members 2 so as to direct the flies contained within the trap toward the opening or aperture 4. These partitions 8 are provided near their upper ends with substantially V-shaped apertures 11 for receiving the conical discharge openings 12. These discharge spouts or openings 12 are formed of wire mesh, having the upper ends of the wire protruding so as to guard against the flies returning to freedom through these conical spouts. These conical spouts 12 are formed so as to constitute an inclosure in the compartment 13, formed below the partitions 8. The flies may enter the conical spouts through the openings 14 formed in the bottom of the trap.

The sides of the trap are reinforced near the bottom thereof, by means of the side members 15 which side members have their lower edges spaced from the bottom of the side members 2, so as to allow the flies to crawl under the trap and up through the cones 12. Of course, it should be understood that any form of bait may be placed within the trap so as to attract the flies.

The sides of the trap are covered by wire mesh netting 16 and the wire mesh netting overhangs the side edges of the side members 2 so as to fit within the grooves 17 formed along the side edges of the side members 2. Metallic bands 18 are placed so as to fit over the edges of the wire mesh 16 and frame, holding the wire mesh in engagement with the frame of the trap. A hook 19 is carried by the top of the trap so as to allow the trap to be suspended if it is so desired.

From the foregoing description it will be seen that a very efficient device has been produced, which is simple in construction, efficient in operation, and consists of a comparatively small number of parts.

What is claimed is:

1. A trap of the class described comprises a frame provided with a base, a framework with a platform carried within said frame, inclined partitions carried within said frame provided with notches formed in their upper ends, means for supporting the base elevated by said frame, and conical entrance openings within said frame and passing through said V-shaped openings formed in said partitions whereby said conical members will be held in a firm position upon said frame.

2. A trap of the class described comprising a frame, said frame provided with a pair of vertically extending side members, a pair of horizontally extending side members, connected to the lower ends of the vertically extending side members, the lower edges of said horizontally extending side members being spaced above the lower edges of said vertically extending side members, a base carried by said frame and having its lower face positioned above the lower edges of said horizontally extending side members, said bottom provided with a plurality of entrance openings and a discharge opening, inclined partitions partially inclosing said entrance openings and directing the flies toward the discharge opening, said partitions provided with apertured upper ends, cones positioned under said inclined partitions and extended through said apertures for admitting the flies into the trap, and a sliding door normally closing said discharge opening.

In testimony whereof I hereunto affix my signature in presence of two witnesses.

JOHN H. HANES.

Witnesses:
R. B. ROBERTS,
G. O. BERRY.

Copies of this patent may be obtained for five cents each, by addressing the "Commissioner of Patents, Washington, D. C."